(12) United States Patent
Kim et al.

(10) Patent No.: US 11,704,291 B2
(45) Date of Patent: Jul. 18, 2023

(54) METHOD FOR PROVIDING DATA ASSOCIATED WITH ORIGINAL DATA AND ELECTRONIC DEVICE AND STORAGE MEDIUM FOR THE SAME

(71) Applicant: SAMSUNG ELECTRONICS CO., LTD., Suwon-si (KR)

(72) Inventors: Junghyun Kim, Suwon-si (KR); Yeonghun Nam, Suwon-si (KR); Junhyung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 631 days.

(21) Appl. No.: 16/748,895

(22) Filed: Jan. 22, 2020

(65) Prior Publication Data

US 2020/0242481 A1  Jul. 30, 2020

(30) Foreign Application Priority Data

Jan. 29, 2019 (KR) .......................... 10-2019-0011223

(51) Int. Cl.
*G06F 21/60* (2013.01)
*G06F 16/20* (2019.01)
(Continued)

(52) U.S. Cl.
CPC .......... *G06F 16/20* (2019.01); *G06F 16/2468* (2019.01); *G06F 21/10* (2013.01);
(Continued)

(58) Field of Classification Search
CPC ....... G06F 21/10; G06F 21/60; G06F 21/6236
See application file for complete search history.

(56) References Cited

U.S. PATENT DOCUMENTS

| 2005/0177714 | A1* | 8/2005 | Jeong | ..................... G06F 21/445 |
| 2006/0041762 | A1* | 2/2006 | Ma | ........................ H04L 9/3226 |
| | | | | 713/189 |

(Continued)

FOREIGN PATENT DOCUMENTS

| KR | 1020050014948 A | 2/2005 |
| KR | 101795259 B1 | 11/2017 |
| WO | 2017187207 A1 | 11/2017 |

OTHER PUBLICATIONS

International Search Report (PCT/ISA/210) dated May 4, 2020 from the International Searching Authority in application No. PCT/KR2020/001302.

(Continued)

*Primary Examiner* — Dao Q Ho
(74) *Attorney, Agent, or Firm* — Sughrue Mion, PLLC

(57) ABSTRACT

According to an embodiment, an electronic device comprises at least one processor, and a memory that stores instructions configured to cause the at least one processor to obtain first data associated with original data based on random number using a first program, obtain first similarity information between the original data and the first data, obtain second data associated with the original data based on the random number using a second program, obtain second similarity information between the original data and the second data, in response to receiving a request, and provide the first program or the second program based on information included in a request that corresponds to a range that includes at least one of the first similarity information or the second similarity information.

16 Claims, 14 Drawing Sheets

(51) Int. Cl.
*G06F 21/62* (2013.01)
*G06F 16/2458* (2019.01)
*G06N 3/045* (2023.01)
*G06F 21/10* (2013.01)

(52) U.S. Cl.
CPC .......... *G06F 21/60* (2013.01); *G06F 21/6236* (2013.01); *G06N 3/045* (2023.01)

(56) References Cited

U.S. PATENT DOCUMENTS

| | | | | |
|---|---|---|---|---|
| 2007/0150857 | A1* | 6/2007 | Korkishko | G06F 21/645 717/136 |
| 2012/0259877 | A1* | 10/2012 | Raghunathan | G06F 21/6254 707/757 |
| 2013/0318630 | A1* | 11/2013 | Lam | H04L 67/1097 726/28 |
| 2017/0019250 | A1* | 1/2017 | Lee | H04L 9/3226 |
| 2017/0161480 | A1* | 6/2017 | Jo | G06F 7/02 |
| 2020/0242481 | A1* | 7/2020 | Kim | G06F 21/6236 |

OTHER PUBLICATIONS

Written Opinion (PCT/ISA/237) dated May 4, 2020 from the International Searching Authority in application No. PCT/KR2020/001302.

* cited by examiner

FIG.10A

ORIGINAL DATA 1005

| | STUDENT ID NUMBER | GENDER | AGE | KOREAN LANGUAGE | MATH | ENGLISH |
|---|---|---|---|---|---|---|
| 1 | 1004 | MALE | 22 | 65 | 55 | 60 |
| 2 | 3259 | MALE | 24 | 90 | 85 | 80 |
| 3 | 5647 | FEMALE | 21 | 50 | 70 | 60 |
| ... | | | | | | |

VS

FIRST PSEUDO DATA (SIMILARITY=50%) 1010

| | STUDENT ID NUMBER | GENDER | AGE | KOREAN LANGUAGE | MATH | ENGLISH |
|---|---|---|---|---|---|---|
| 1 | 54634 | FEMALE | 12 | 99 | 98 | 97 |
| 2 | 25478 | FEMALE | 34 | 1 | 2 | 23 |
| 3 | 22 | FEMALE | 55 | 11 | 22 | 13 |
| ... | | | | | | |

FIG.10B

ORIGINAL DATA 1005

| | STUDENT ID NUMBER | GENDER | AGE | KOREAN LANGUAGE | MATH | ENGLISH |
|---|---|---|---|---|---|---|
| 1 | 1004 | MALE | 22 | 65 | 55 | 60 |
| 2 | 3259 | MALE | 24 | 90 | 85 | 80 |
| 3 | 5647 | FEMALE | 21 | 50 | 70 | 60 |
| ... | | | | | | |

VS

SECOND PSEUDO DATA (SIMILARITY=70%) 1015

| | STUDENT ID NUMBER | GENDER | AGE | KOREAN LANGUAGE | MATH | ENGLISH |
|---|---|---|---|---|---|---|
| 1 | 6548 | MALE | 16 | 83 | 76 | 88 |
| 2 | 4758 | FEMALE | 29 | 41 | 30 | 45 |
| 3 | 2647 | FEMALE | 35 | 32 | 55 | 39 |
| ... | | | | | | |

ORIGINAL DATA 1005

| | STUDENT ID NUMBER | GENDER | AGE | KOREAN LANGUAGE | MATH | ENGLISH |
|---|---|---|---|---|---|---|
| 1 | 1004 | MALE | 22 | 65 | 55 | 60 |
| 2 | 3259 | MALE | 24 | 90 | 85 | 80 |
| 3 | 5647 | FEMALE | 21 | 50 | 70 | 60 |
| ... | ... | ... | ... | ... | ... | ... |

VS

SECOND PSEUDO DATA (SIMILARITY=90%) 1020

| | STUDENT ID NUMBER | GENDER | AGE | KOREAN LANGUAGE | MATH | ENGLISH |
|---|---|---|---|---|---|---|
| 1 | 1007 | MALE | 21 | 66 | 53 | 62 |
| 2 | 3280 | MALE | 23 | 92 | 87 | 74 |
| 3 | 4899 | FEMALE | 22 | 47 | 69 | 64 |
| ... | ... | ... | ... | ... | ... | ... |

METHOD FOR PROVIDING DATA ASSOCIATED WITH ORIGINAL DATA AND ELECTRONIC DEVICE AND STORAGE MEDIUM FOR THE SAME

CROSS-REFERENCE TO RELATED APPLICATION(S)

This application is based on and claims priority under 35 U.S.C. § 119 to Korean Patent Application No. 10-2019-0011223, filed on Jan. 29, 2019, in the Korean Intellectual Property Office, the disclosure of which is herein incorporated by reference in its entirety.

BACKGROUND

Field

Various embodiments relate to a method for providing data associated with original data and an electronic device and storage medium for the same.

Description of Related Art

With smartphones or other electronic devices gaining higher performance, various services are being offered on electronic devices. For example, more applications are coming in wider use to provide more sophisticated services, e.g., Bixby, via Artificial Intelligence (AI) technology. Such AI technology may self learn and may judge and, as AI is used more, may deliver a better recognition rate, such as, a more accurate recognition rate. AI technology may encompass machine learning (deep learning) that may adopt an algorithm of classifying and learning features of entered user data on its own and element techniques that imitate the human brain's perception or determination.

In such technology as Internet of Things (IoT), sensors may be embedded in various objects, including one or more home appliances, to obtain data from an external environment, and the IoT objects may also have communication capability/capabilities for connection to another device and/or the Internet.

As these technologies advance, user data may be diversified and, as is the tendency, may contain more user-related sensitive information including more types of user-related sensitive information, e.g., biometric information or health information. However, to provide a sophisticated, customized service(s), a need exists in the related technology for developing services using actual, user-related data.

As various services become available to electronic device users, security, privacy, and protection of user data are material issues. To ensure applications work properly, actual user data may be needed during development and testing.

Application developers may do their job in other environments than the company that manages actual user data and, for security purposes, accessing the actual user data may be difficult. If actual user data is provided to developers, the users' privacy may be put at risk and complicated legal procedures may ensue.

Thus, a need has arisen in the related art for a method for allowing application developers or companies to use processed data, which is similar but not identical to user data (e.g., user-related sensitive information), for test purposes.

The above information is presented as background information only to assist with an understanding of the disclosure. No determination has been made, and no assertion is made, as to whether any of the above might be applicable as prior art with regard to the disclosure.

SUMMARY

According to various embodiments, there may be provided a method for providing data similar to user data.

According to an embodiment, an electronic device comprises at least one processor, and a memory that stores instructions configured to cause the at least one processor to obtain first data associated with original data based on random number using a first program, obtain first similarity information between the original data and the first data, obtain second data associated with the original data based on the random number using a second program, obtain second similarity information between the original data and the second data, in response to receiving a request, and provide the first program or the second program based on information included in a request that corresponds to a range that includes at least one of the first similarity information or the second similarity information.

In accordance with various embodiments, a method for providing data associated with original data by an electronic device comprises obtaining first data associated with original data based on random number using a first program, obtaining first similarity information between the original data and the first data, obtaining second data associated with the original data based on and the random number using a second program, obtaining second similarity information between the original data and the second data; and in response to receiving a request, providing the first program or the second program based on information included in the request that corresponds to a range that includes at least one of the first similarity information or the second similarity information.

In accordance with various embodiments, there is provided a non-transitory storage medium storing instructions, wherein the instructions are configured to, when executed by at least one processor, enable the at least one processor to perform at least one operation, the at least one operation comprising obtaining first data associated with original data based on random number using a first program, obtaining first similarity information between the original data and the first data, obtaining second data associated with the original data based on and the random number using a second program, obtaining second similarity information between the original data and the second data; and in response to receiving a request, providing the first program or the second program based on information included in the request that corresponds to a range that includes at least one of the first similarity information or the second similarity information.

In accordance with various embodiments, an electronic device may comprise at least one processor; and a memory, wherein the memory stores instructions configured to, when executed, cause the at least one processor to obtain first data associated with original data based on a first program and random number, associate first similarity information with the first program based on a first result of comparison, which is between the original data and the first data, obtain second data associated with the original data based on a second program and the random number, associate second similarity information with the second program based on a second result of comparison, which is between the original data and the second data, and based on obtaining a request, provide the first program or the second program based on information included in the request that corresponds to a range that includes at least one of the first similarity information or the second similarity information.

The instructions may be configured to cause the at least one processor to associate the first data with the first similarity information based on the first comparison result, which is between the original data and the first data, and associate the second data with the second similarity information based on the second comparison result, which is between the original data and the second data.

The instructions may be configured to cause the at least one processor to provide the random number along with the program, from among the first program and the second program, that has similarity information, from among the respective first similarity information and the second similarity information, that corresponds to the third similarity information.

The instructions may be configured to cause the at least one processor to obtain the first data and the second data by performing repeated machine learning based on a generative adversarial network (GAN).

The instructions may be configured to cause the at least one processor to: based on the first similarity information corresponding to a first threshold or a first threshold range, store the first program along with the random number or the first data associated with the first similarity information, or based on the second similarity information corresponding to a second threshold or a second threshold range, store the second program along with the random number or the second data associated with the second similarity information.

The instructions may be configured to cause the at least one processor to identify the first similarity information and the second similarity information using a designated similarity scheme.

The instructions may be configured to cause the at least one processor to, based on the request being obtained, identify an authority corresponding to the request and, provide data associated with similarity information corresponding to a range of the identified authority.

In an embodiment, the first similarity information is lower than the second similarity information, and an authority designated for the first similarity information is lower than an authority designated for the second similarity information.

In an embodiment, the instructions may be configured to cause the at least one processor to, corresponding to the request, identify whether the request is for data corresponding to a first region identical to a region where the electronic device is located and, based on the request being for the data corresponding to the first region, identify an authority corresponding to the request and, corresponding to the identified authority, provide data associated with similarity information corresponding to a range of the identified authority.

In an embodiment, the instructions may be configured to cause the at least one processor to, corresponding to the request, identify whether the request is for data corresponding to a second region different from a region where the electronic device is located and, based on the request being for the data corresponding to the second region, identify an authority corresponding to the request, and provide a program for obtaining data associated with similarity information corresponding to a range of the identified authority.

In accordance with various embodiments, there is provided a method for providing data associated with original data by an electronic device. The method may comprise: obtaining first data associated with original data based on a first program and random number; associating first similarity information with the first program based on a first result of comparison, which is between the original data and the first data; obtaining second data associated with the original data based on a second program and the random number; associating second similarity information with the second program based on a second result of comparison, which is between the original data and the second data; and based on obtaining a request, providing the first program or the second program based on information included in the request that corresponds to a range that includes at least one of the first similarity information or the second similarity information.

In accordance with various embodiments, there is provided a non-transitory storage medium storing instructions, wherein the instructions are configured to, when executed by at least one processor, cause the at least one processor to perform at least one operation, the at least one operation comprising: obtaining first data associated with original data based on a first program and random number; associating first similarity information with the first program based on a first result of comparison, which is between the original data and the first data; obtaining second data associated with the original data based on a second program and the random number; associating second similarity information with the second program based on a second result of comparison, which is between the original data and the second data; and based on obtaining a request, providing the first program or the second program based on information included in the request that corresponds to a range that includes at least one of the first similarity information or the second similarity information.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 10A is a view illustrating example data corresponding to original data in a first similarity according to an embodiment;

FIG. 10B is a view illustrating example data corresponding to original data in a second similarity according to an embodiment;

FIG. 10C is a view illustrating example data corresponding to original data in a third similarity according to an embodiment;

Throughout the drawings, like reference numerals will be understood to refer to like parts, components, and structures.

DETAILED DESCRIPTION

The terms as used herein are provided merely to describe some embodiments thereof, but not to limit the scope of other embodiments of the disclosure. It is to be understood that the singular forms "a", "an" and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Figure 1:
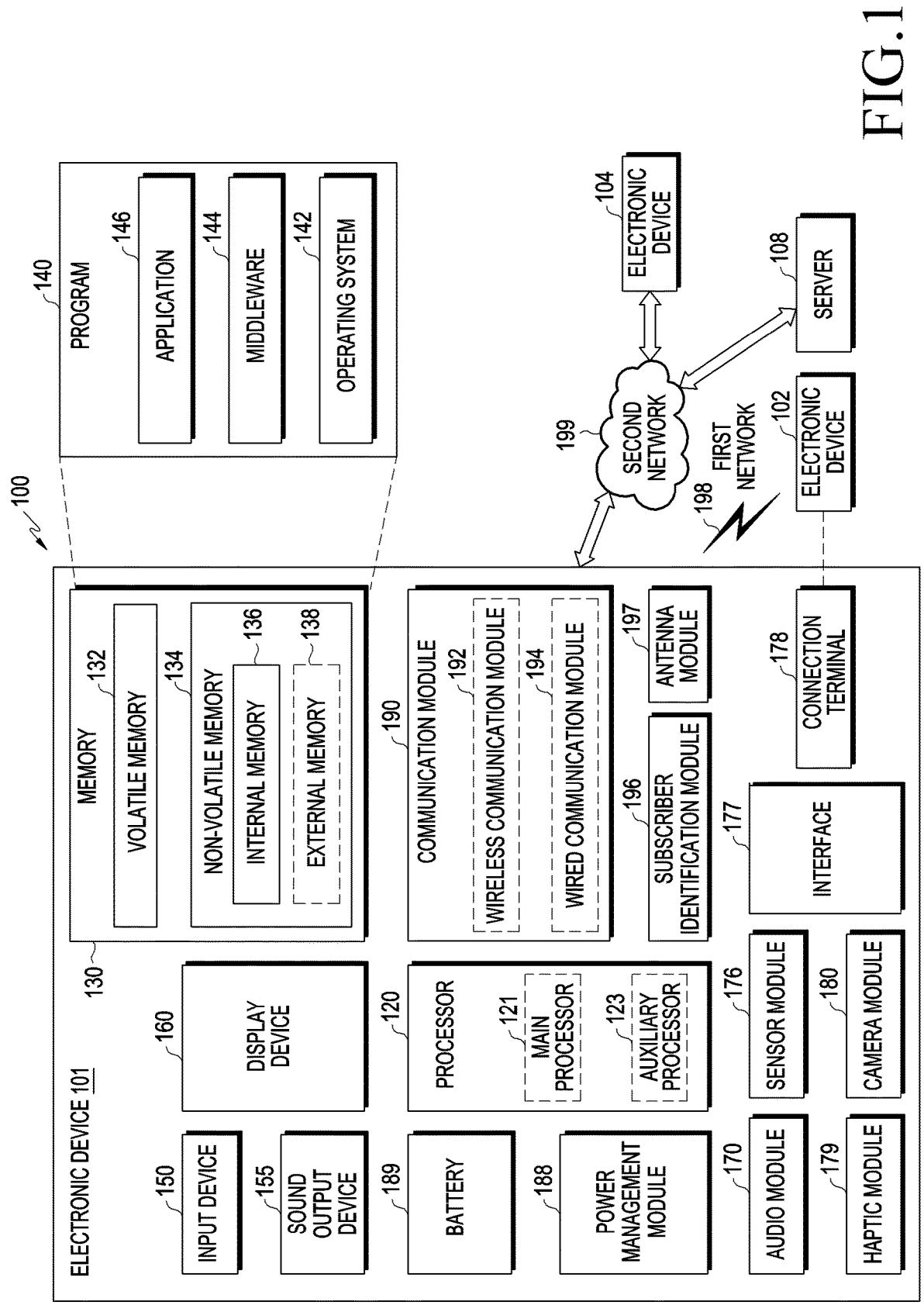
FIG. 1 is a view illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
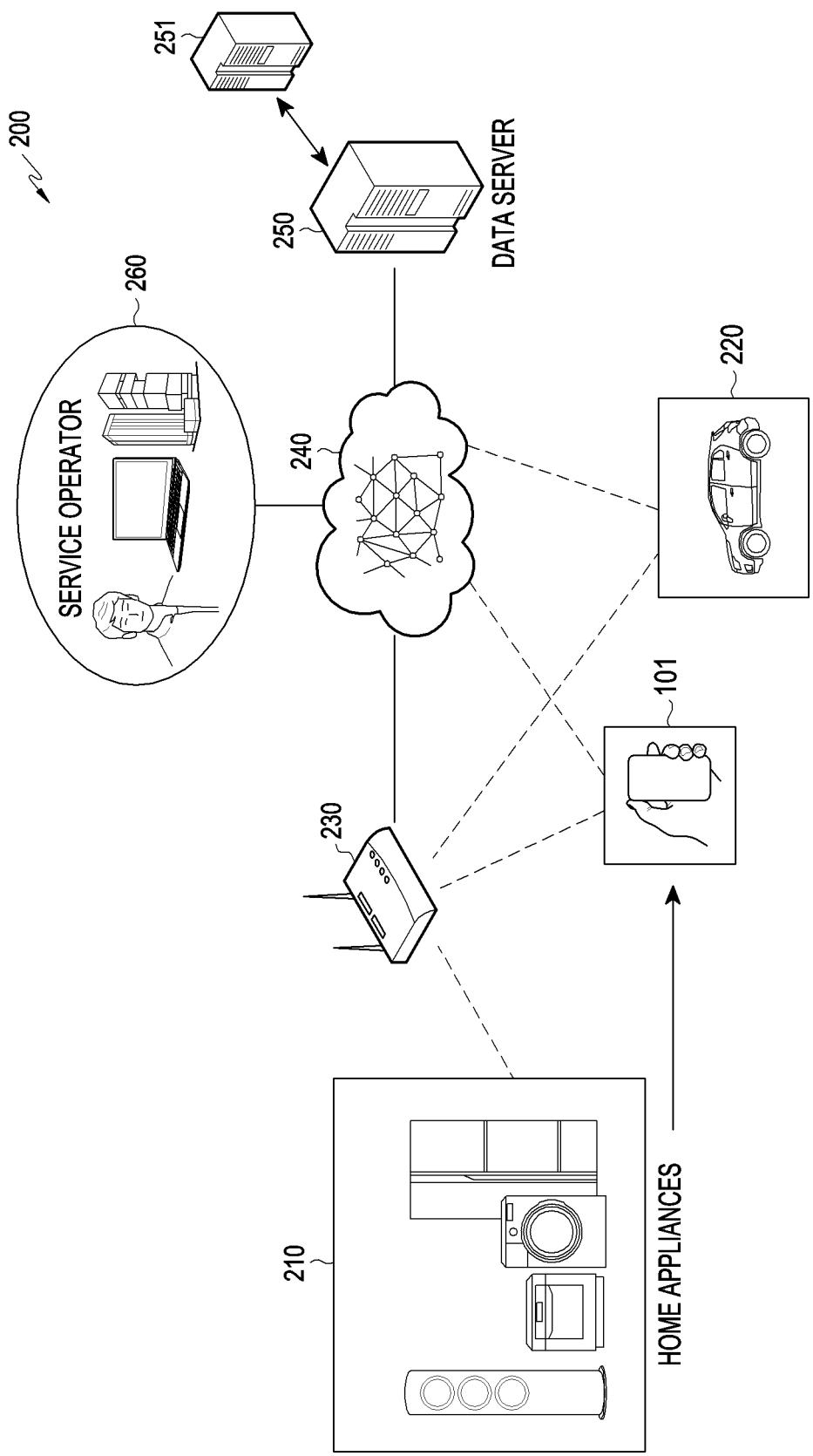
FIG. 2 is a view illustrating a configuration of a data processing system for gathering and processing original data according to an embodiment.

FIG. 2 is a view illustrating a configuration of a data processing system 200 for gathering and processing original data according to an embodiment.

Referring to FIG. 2, a data processing system 200 may include an electronic device 101, home appliances 210, a vehicle 220, an accessing device 230, one or more data servers 250 and 251, and one or more service operators 260.

The home appliances 210 may include, but are not limited to, at least one home appliance, such as a smart refrigerator(s), a smart washer(s), a television(s) (TV(s)), a computer(s), or an air conditioner(s). The home appliances 210 may include one or more sensors for obtaining data from the external environment. The home appliances 210 may be one or more devices that access the accessing device 230 without security authentication, devices that access the accessing device 230 via limited security authentication, or devices that access the accessing device 230 via a security authentication platform. For example, the home appliances 210 may be implemented as Internet-of-Things (IoT) devices, but are not limited thereto. Here, the IoT devices may be devices capable of transmitting and obtaining data to/from at least one device via a communication interface.

The home appliances 210, the electronic device 101, and the vehicle 220 may communicate with one another by forming a home network via the accessing device 230, e.g., an access point (AP), and each of them may communicate detection data or control information with the accessing device 230. The accessing device 230 may be a stand-alone device or may be embedded in each (or one or more of) the home appliances 210 as is a hub. For example, the user may monitor or control at least one home appliance 210 or the electronic device 101 connected with the hub via a display of, for example, a smart refrigerator.

The network 240 may be a data communication network, e.g., a private network or a public network. For example, examples of the network 240 may include at least one of a private area network which may cover a home, a local area network (LAN) which may cover a building, and a wide area network (WAN) which may cover a large city, a region, or a country border, or the Internet.

The one or more data servers 250 and 251 may gather various types of user data output from the accessing device 230 through the network 240 and may create and manage them in the form of a database. There may be a plurality of data servers 250 and 251 to gather user data per region or per country. For ease of description, operations of the data server 250 are described below as an example.

The user data thusly gathered may be stored in various saving formats, e.g., in the form of a database table, a spreadsheet file, a text file, or an image file. According to an embodiment, the one or more data servers 250 and 251 may generate data which has been processed to be similar to actual user data based on the user data. The processed data may be stored in a storage system accessible by the service operator 260. Here, the storage system accessible by the service operator 260 may be implemented in the data server 250 or may be implemented independently from the data server 250 and managed by the data server 250. The storage system may include one or more memories.

As described above, the data server 250 may provide not actual data but the data processed to be similar to actual data or information related to the processed data to the service operator 260, thereby raising security for sensitive data, such as user data. Besides, the data server 250 may process data based on user data and provide the processed data to the service operator 260, e.g., a developer, to be used as test data. In particular, the data server 250 may provide data which meets the legal standards of the country where the data is to be used by providing the processed data. For example, a country which follows the General Data Protection Regulations (GDPR) may limit offshore use of privacy-related user data. According to an embodiment, if user data needs to be exchanged between countries, processed data or a program capable of providing processed data may be provided, which may free the data processing from any legal issues. According to an embodiment, the data server 250 may provide data processed in different levels depending on what kind of authority the entity demanding user data, e.g., a service operator, has, and, thus, the data server 250 may advantageously provide data meeting the privacy policy standards.

For example, if the data server 250 manages region A, the data server 250 may provide data for region A, which is generated in a similar form to the original data, corresponding to a request for data from the service operator 260 located in region A.

Although the data server 250 may provide processed data similar to the original data for region A, if a vast amount of data is demanded, the data server 250 may provide a program for generating data for region A so that the service operator 260 itself may process and analyze data. In contrast, if the service operator 260 located in region A requests data for region B, the data server 250 managing region A may notify the data server 251 managing region B that there is a request for data for region B. Here, the service operator 260 located in region A may be meant to request data for region B, e.g., a different country. Thus, the service operator 260 located in region A may obtain data for region B from the data server 251 managing region B via the data server 250 managing region A. A process for obtaining data per region is described below in greater detail.

The service operator 260 may analyze data provided from the data server 250 and, according to a result of analysis, provide various services to the user. According to an embodiment, rather than directly obtaining the original data that the data server 250 owns, the service operator 260 may obtain data created in a similar form to the original data from the data server 250.

Thus, the service operator 260 may analyze the data similar to the original data, which is provided from the data server 250. The service operator 260 may generate a service related to the analyzed data or may provide the analyzed data to at least one of the home appliances 210, the electronic device 101, or the vehicle 220. For example, the service operator 260 may provide such a service as a home-care or health-care service to at least one of the home appliances 210 or the electronic device 101 and may provide a vehicle service, which may be based on the driver's personal information, to the vehicle 220. The service operator 260 may be implemented in the form of a server and may provide various services to the user depending on the result of analysis, and the kind of service is not limited thereto.

Figure 3:
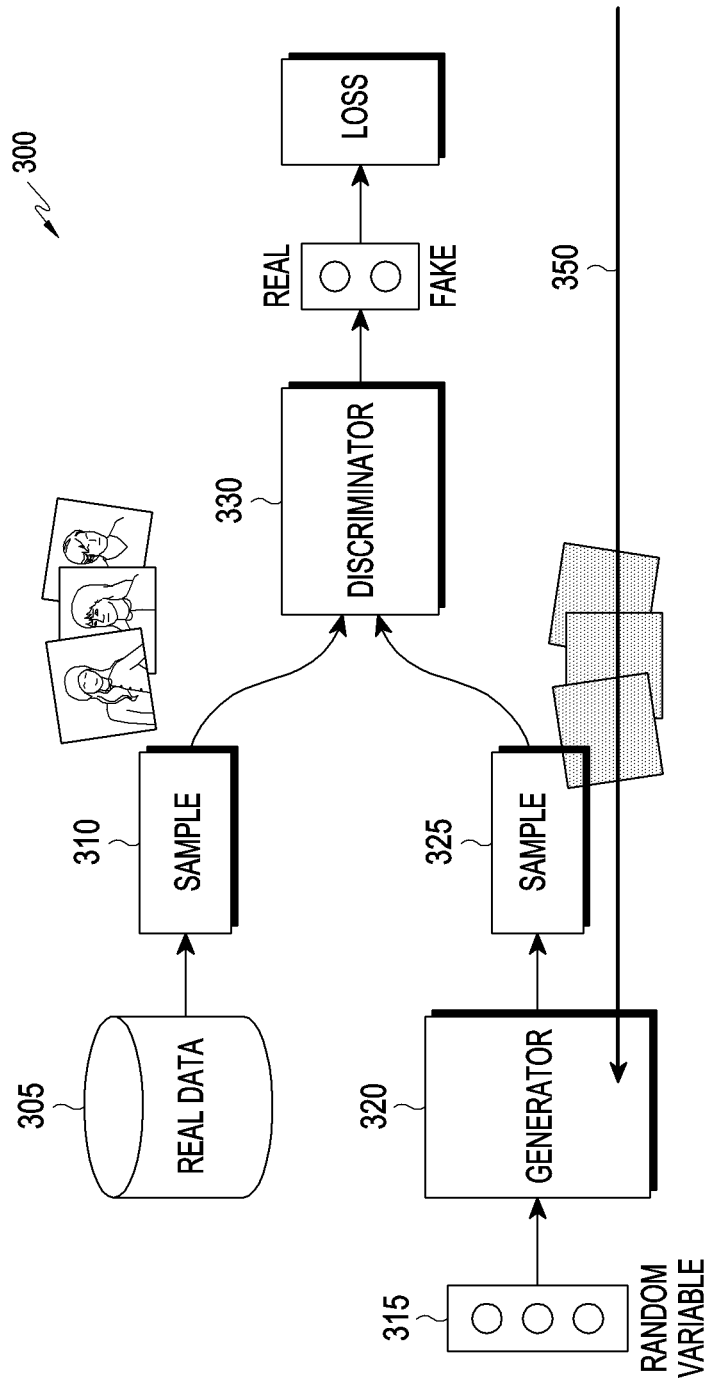
FIG. 3 is a view illustrating a learning process by a generative adversarial network (GAN) according to an embodiment.

FIG. 3 is a view 300 illustrating a learning process by a GAN according to an embodiment.

Referring to FIG. 3, according to an embodiment, obtaining data similar to user data may be based on a generative adversarial network (GAN) algorithm. Here, the GAN may be an algorithm that learns via competition between at least two neural network models and produces a result. The at least two neural network models may be referred to as or include a generator 320 and a discriminator 330.

The GAN may include the generator 320 that may create some data and the discriminator 330 that may distinguish the data from authentic data (or desired data). The generator 320 may use a random variable 315, e.g., random noise, as its input value, may generate processed data for the authentic/ real data 305 from the input value, and may transfer the generated data, as its output value, to the discriminator 330.

The discriminator 330 may identify whether the processed data 325 generated by the generator 320 may be distinguished from the authentic data 305, thereby judging the authenticity of the processed data 325 generated. The discriminator 330 may output a result value indicating the authenticity, such as, e.g., 1 for authentic or 0 for fake. In this case, identification as to whether the processed data is distinguishable from the authentic/real data may be performed by the GAN. The discriminator 330 and the generator 320 may enhance their ability by their mutual adversarial competition.

According to an embodiment, the generator 320 may be trained in such a manner indicated with arrow 350 to be able to create data similar to the authentic data 305 in various levels. As such, by repeating the process of transferring the result by the discriminator 330 to the generator 320 so that the discriminator 330 may identify that the data generated by the generator 320 is authentic data to thereby update the generator 320, the generator 320 may be trained to be able to create data close to the authentic data.

If used in generating images as shown in FIG. 3, a fake image may be created by training the authentic image. For example, an unlimited number of photos may be created for nonexistent people by training with a head shot and, if the count of learning increases, it may be hard to identify whether it is a real-world one or a fake with the naked eye. According to an embodiment, examples of original data which may be learned may include data, such as structure data, text, voices, images, or photos, or data containing privacy information, such as names, addresses, birth dates, credit card information, or bank accounts.

According to an embodiment, the original data may also be referred to as user data, actual data, real data, or authentic data.

According to an embodiment, since the data similar to the original data has partially similar features but is not the same as the original data, the data may be referred to as fake data, processing data, pseudo data, obfuscated data, or plausible data.

As set forth above, the generator 320 may have the capability of generating fake data that is as similar to the original data as possible, and the discriminator 330 may have the capability of distinguishing fake data from the original data, and the generator 320 and the discriminator 330 may enhance their capability by their mutual competition. This process is described below in an easier way to understand.

For example, if the generator is a money counterfeiter, and the discriminator 330 is a counterfeit specialist who spots counterfeit bills, then the counterfeiter would attempt to deceive the counterfeit specialist as effectively as possible while the counterfeit specialist would try to discriminate between counterfeit and authentic bills. Adversarial competition between the two entities causes the capability of deceiving and discriminating between both to evolve, resultantly rendering it difficult to distinguish between authentic and fake bills.

Figure 4:
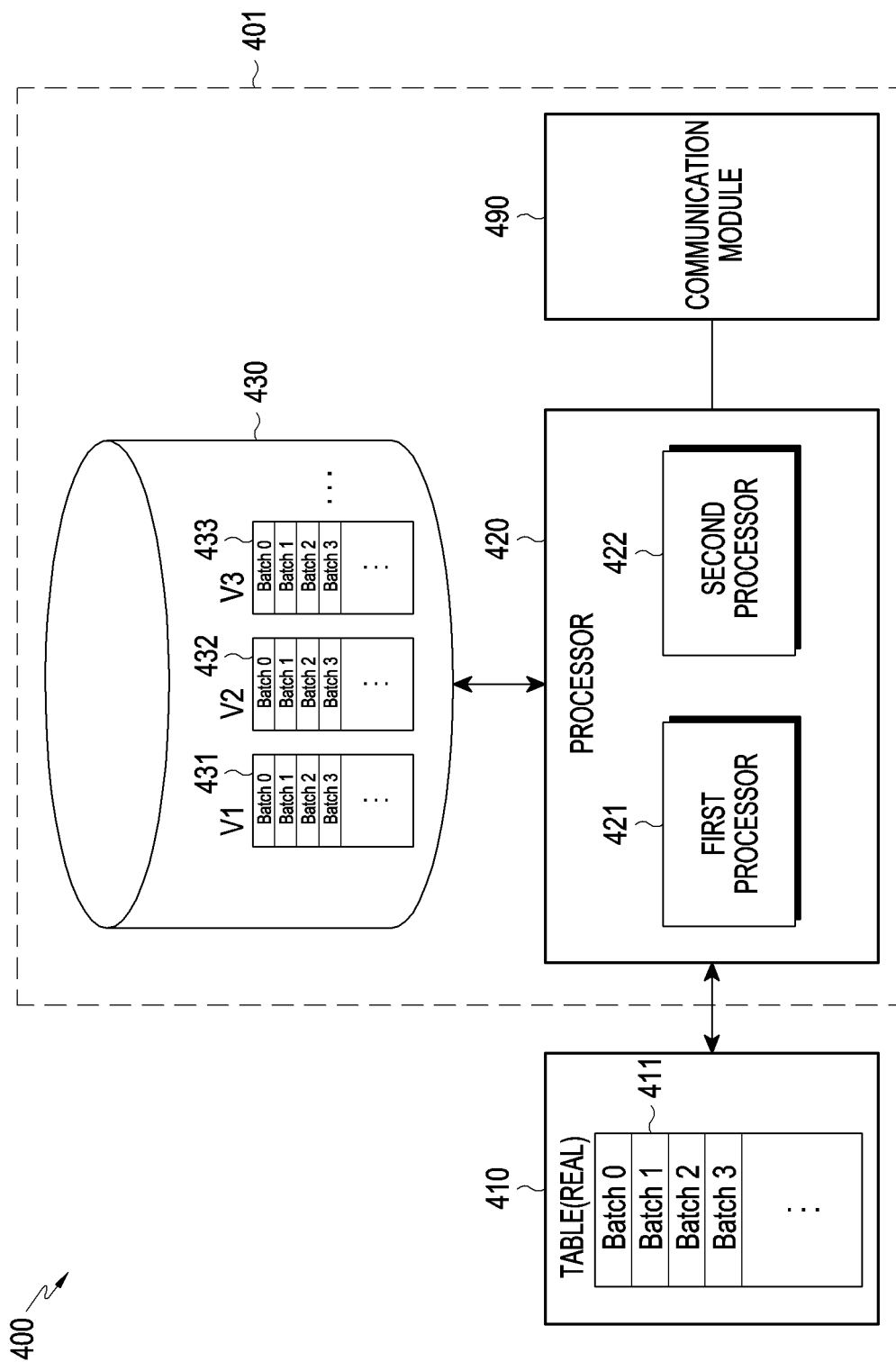
FIG. 4 is a block diagram illustrating an electronic device for providing data associated with original data according to an embodiment.

FIG. 4 is a block diagram 400 illustrating an electronic device for providing data associated with original data according to an embodiment. The electronic device of FIG. 4 may correspond to the data server 250 of FIG. 2 and may operate in the same manner as the data server 250 of FIG. 2 does. Specific operations of the electronic device of FIG. 4 are described below with reference to FIG. 4.

Referring to FIG. 4, the electronic device 401 (e.g., the data server 250) may include a processor(s) 420, a memory 430, and a communication module 490. The communication module 490 may include a communication interface. For example, the electronic device 401 may include the configuration of a computer system that gathers original data or may be implemented as an electronic device that communicates with a computer operating an environment of generating data similar to original data. For example, if the electronic device is implemented to serve as the data server 250, it may have the same configuration as the electronic device 101 of FIG. 1.

The processor 420 may include at least one processor and, as shown in FIG. 4, may include a first processor 421 and a second processor 422. According to an embodiment, the first processor 421 may be operated based on a generator model, and the second processor 422 may be operated based on a discriminator model. According to an embodiment, the at least one processor 420 may be configured to include a generator that generates pseudo data which is the result of applying random number to original data and a discriminator that identifies the authenticity of the generated pseudo data.

The memory 430 may include a first storage area for storing pseudo data per authority and a second storage area for storing a program for generating pseudo data per authority. According to an embodiment, the program for generating pseudo data may be referred to as a generator model, and the second storage area may also be referred to as a generator model repository.

For example, the higher level the authority is, the more sensitive the data is. Thus, the number of times of creating pseudo data using original data may also rise. As the learning count increases, the created data may get closer to the original data, and similarity to the original data may thus increase.

For example, with a higher authority, the service operator may access more sensitive data. Thus, the pseudo data available to the service operator with a higher-level authority may be closer in similarity to the original data.

According to an embodiment, FIG. 4 illustrates an example of original data 411 which may be stored in the saving format of a database table of the data source 410 gathered. The data source 410 containing the original data 411 may be stored in the electronic device 401 or may also be stored in a storage medium to which the electronic device 401 may gain access.

Meanwhile, as GAN-based learning continues longer, i.e., as the learning count increases, the data created via learning may resultantly get closer to the original data. However, at the early stage of learning, the similarity between the result and the original data may be very low. According to an embodiment, since pseudo data may be generated differently depending on the learning count using the GAN, the generated pseudo data may differ in similarity from the original data.

For example, if the pseudo data is divided into three steps, data generated via a largest number of times of learning based on the GAN may be termed as first pseudo data, data generated via a next largest number of times of learning as second pseudo data, and data generated via the smallest number of times of learning as third pseudo data. For example, a generator model trained via at least 100 steps of learning, a generator model trained via at least 1,000 steps of learning, and a generator model trained via at least 10,000 steps of learning may be called a 'poor-trained model,' a 'mid-trained model', and a 'well-trained model,' respectively.

According to an embodiment, as a reference for classifying pseudo data, rather than counting the number of times of learning, measuring the similarity between the generated pseudo data and the original data may be put to use. According to an embodiment, example similarity measuring schemes between pieces of data may include, but are not limited to, Euclidean distance, Mahalanobis distance, Minkowski distance, cosine similarity, or such schemes, or other various schemes may also be applied without limitations.

For example, after analyzing how much the pseudo data differs from the original data, i.e., how similar the pseudo data and the original data are, if pseudo data with a designated similarity is obtained, a generator model (or program) for generating data corresponding to the designated similarity may be acquired as well. Or, random number input to the program that generates the data corresponding to the designated similarity may be obtained. Thus, the generator model may be stored to correspond to the designated similarity, along with the random number applied to the generator model upon obtaining the data corresponding to the designated similarity. Or, the data corresponding to the designated similarity may be stored.

In an example where pseudo data is divided into three steps, if the difference between the original data and the random number-applied first pseudo data reaches a first threshold, i.e., when the similarity between the original data and the first pseudo data reaches a first similarity threshold (e.g., 50%), the processor 420 may obtain a first generator model (or program) for generating data corresponding to the first similarity and store the first generator model in the memory 430. The processor 420 may store the first pseudo data 431, which is obtained upon obtaining the first pseudo data which has reached the first similarity threshold, in the memory 430. The processor 420 may store, in the memory 430, the random number which has been applied to the first generator model for generating the data corresponding to the first similarity threshold upon obtaining the first pseudo data which has reached the first similarity threshold.

Likewise, if the similarity between the original data and the random number-applied second pseudo data reaches a second similarity threshold (e.g., 70%), the processor 420 may obtain a second generator model (or program) for generating data corresponding to the second similarity threshold and store the second generator model in the memory 430. The processor 420 may store the second pseudo data 432, which is obtained upon obtaining the second pseudo data which has reached the second similarity threshold, in the memory 430. The processor 420 may store, in the memory 430, the random number which has been applied to the second generator model for generating the data corresponding to the second similarity threshold upon obtaining the second pseudo data which has reached the second similarity threshold.

By repeating the above-described process, learning is performed. If the similarity between the original data and the random number-applied third pseudo data reaches a third similarity threshold (e.g., 90%), the processor 420 may obtain a third generator model (or program) for generating data corresponding to the third similarity threshold and store the third generator model in the memory 430. The processor 420 may store the third pseudo data 433, which is obtained upon obtaining the third pseudo data which has reached the third similarity threshold, in the memory 430. The processor 420 may store, in the memory 430, the random number which has been applied to the third generator model for generating the data corresponding to the third similarity threshold upon obtaining the third pseudo data which has reached the third similarity threshold. As such, the same random number may be stored together when different generator models are stored corresponding to different similarities. In other words, although different generator models are created via learning, the same random number may be applied as an input value to the generator models.

As set forth above, the processor 420 may stepwise increase the threshold corresponding to the similarity and may steadily repeat the operations of measuring the similarity between the original data and pseudo data obtained via learning by the first processor 421 and identifying whether it reaches the threshold. Thus, classifiable pieces of pseudo data, generator models for the same, or random number may be obtained and may be distinctively stored stepwise or on a per-version basis depending on the similarity. Thus, the authority corresponding to the generator model or classified pseudo data may be designated, and the pseudo data or generator model may be stored per designated authority.

For example, if the authority is divided into three levels 1, 2, and 3, authority level 1 may be designated for a first program for generating data corresponding to the first threshold, authority level 2 may be designated for a second program for generating data corresponding to the second threshold, and authority level 3 may be designated for a third program for generating data corresponding to the third threshold. Alternatively, authority level 1 may be designated for first pseudo data corresponding to the first threshold, authority level 2 may be designated for second pseudo data corresponding to the second threshold, and authority level 3 may be designated for third pseudo data corresponding to the third threshold. Here, the first similarity threshold may be lower than the second similarity threshold. Authority level 1 designated for the first program may be lower than Authority level 2 designated for the second program. Thus, as the authority level rises, the similarity in pseudo data may increase.

According to an embodiment, the processor 420 may identify the authority corresponding to an external device corresponding to a request from the external device (e.g., the service operator 260 of FIG. 2). Since the external device is the entity that uses data for test or analysis, the external device may be referred to as a data analyzer device or client/client device.

The memory 430 may store management policies individually or severally corresponding to service operators. Thus, if the authority corresponding to the external device is identified with reference to the management policies stored in the memory 430, the processor 420 may provide pseudo data corresponding to the identified authority among the pieces of data stored in the memory 430. For example, the management policy for each service operator may include a security grade as well as authority information, but is not limited thereto. Thus, pseudo data with a higher similarity may be provided to a service operator with a higher security grade.

According to an embodiment, if the data requested by the external device is data corresponding to a first region which is identical to the region where the electronic device 401 is located, the processor 420 may identify the authority corresponding to the external device and provide pseudo data corresponding to the identified authority. For example, if the region managed by the data server 250 is the first region, it may be possible to provide pseudo data corresponding to a request for data corresponding to the first region.

In contrast, if the data requested by the external device is data corresponding to a second region which is different from the region where the electronic device 401 is located, the processor 420 may send a request for a program (or generator model) for generating data corresponding to the second region to a server (e.g., the data server 251 of FIG. 2) which manages the second region. The processor 420 may obtain, from the server managing the second region, a third program for generating the data corresponding to the second region and random number applied to the third program corresponding to the request. The processor 420 may obtain the data corresponding to the authority of the external device using the third program and provide the obtained data to the external device.

The communication module 490 may be referred to as communication circuitry or a communication interface, and the processor 420 may communicate with a service operator (e.g., the service operator 260 of FIG. 2) via the communication module 490. Thus, the processor 420 may provide pseudo data or a program for generating pseudo data to the service operator (e.g., the service operator 260 of FIG. 2) via the communication module 490. Or, the processor 420 may provide a program for generating pseudo data via the communication module 490 corresponding to a request from the data server 251 located in a different region.

According to an embodiment, the memory 430 may store instructions executed to cause the at least one processor 420 to obtain first data associated with original data based on random number, associate a first similarity (also referred to as first similarity information) with a first program for obtaining the first data based on a first result of comparison between the original data and the first data, obtain second data associated with the original data based on the random number, associate a second similarity (also referred to second similarity information) with a second program for obtaining the second data based on a second result of comparison between the original data and the second data, and provide a program for obtaining data associated with a similarity corresponding to a request of the first similarity and the second similarity in response to the request.

In an embodiment, the memory may store instructions that, when executed, cause the at least one processor to obtain first data associated with original data based on random number using a first program, obtain first similarity information between the original data and the first data, obtain second data associated with the original data based on the random number using a second program, obtain second similarity information between the original data and the second data, in response to receiving a request, and provide the first program or the second program based on information included in a request that corresponds to a range that includes at least one of the first similarity information or the second similarity information.

According to an embodiment, the instructions may be configured to cause the at least one processor 420 to associate the first data with the first similarity threshold based on the first comparison result between the original data and the first data and associate the second data with the second similarity threshold based on the second comparison result between the original data and the second data.

According to an embodiment, the instructions may be configured to cause the at least one processor to store the first program associated with the first similarity information based on the first comparison result, which is between the original data and the first data, and store the second program associated with the second similarity information based on the second comparison result, which is between the original data and the second data.

According to an embodiment, the instructions may be configured to cause the at least one processor 420 to provide the random number along with the program for obtaining the data associated with the similarity threshold corresponding to the request.

According to an embodiment, the instructions may be configured to cause the at least one processor 420 to obtain the first data and the second data by repeated learning based on a generative adversarial network (GAN).

According to an embodiment, the instructions may be configured to cause the at least one processor 420 to, if the similarity between the original data and the first data corresponds to a first threshold as a first comparison result, store the first program for obtaining the first data along with the random number or the first data associated with the first similarity and, if the similarity between the original data and the second data corresponds to a second threshold as the second comparison result, store the second program for obtaining the second data along with the random number or the second data associated with the second similarity. For example, when generator models, such as the first program and the second program are stored, weights or parameters applied to the generator models may also be stored.

According to an embodiment, the instructions may be configured to cause the at least one processor 420 to identify the similarity between the original data and the first data and the similarity between the original data and the second data using a designated similarity scheme.

According to an embodiment, the instructions may be configured to cause the at least one processor 420 to, based on the request being obtained, identify an authority corresponding to the request and, corresponding to the identified authority, provide data associated with a similarity corresponding to the request of the first similarity and the second similarity. According to an embodiment, the first similarity may be lower than the second similarity, and an authority designated for the first similarity may be lower than an authority designated for the second similarity.

According to an embodiment, the instructions may be configured to cause the at least one processor 420 to, corresponding to the request, identify whether the request is for data corresponding to a first region identical to a region where the electronic device is located and, based on identifying that the request is for the data corresponding to the first region, identify an authority corresponding to the request and, corresponding to the identified authority, provide data associated with a similarity corresponding to the request, from among the first similarity and the second similarity.

According to an embodiment, the instructions may be configured to enable the at least one processor 420 to, corresponding to the request, identify whether the request is for data corresponding to a second region different from a region where the electronic device is located and, based on the request being for the data corresponding to the second region, identify an authority corresponding to the request, and provide a program for obtaining data associated with a similarity corresponding to the identified authority, from among the first similarity and the second similarity.

Figure 5:
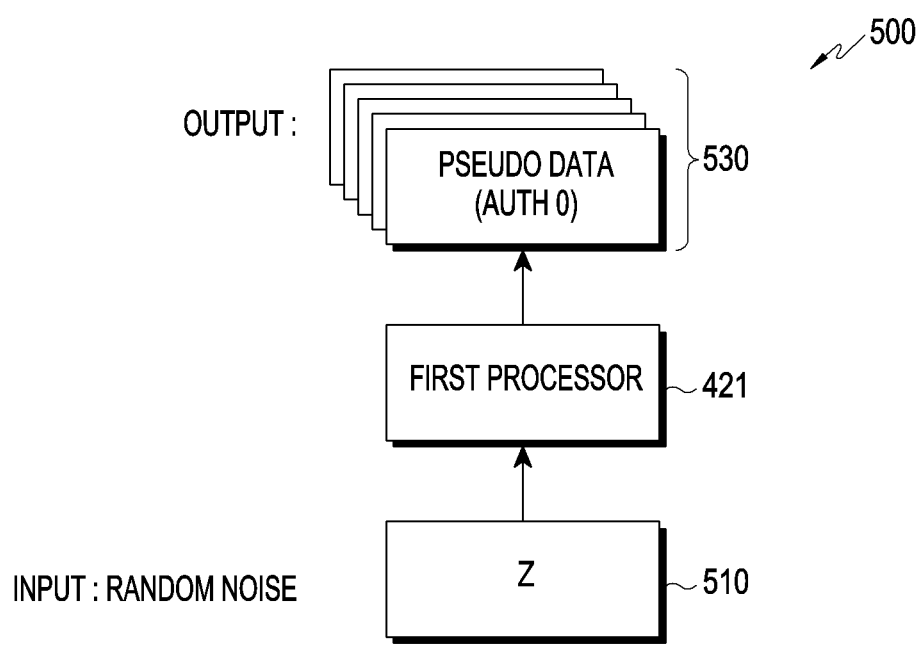
FIG. 5 is a view illustrating a method for generating data associated with original data according to an embodiment.

FIG. 5 is a view 500 illustrating a method for generating data associated with original data according to an embodiment.

Referring to FIG. 5, the first processor 421 may correspond to the first processor 421 of FIG. 4 and may be operated based on a generator model. The generator model may be a function or algorithm as shown in Equation 1.

$$\min_G \max_D V(D, G) = \mathbb{E}_{x \sim p_{data}(x)}[\log D(x)] + \mathbb{E}_{z \sim p_x(z)}[\log(1 - D(G(z)))]$$

[Equation 1]

In Equation 1 above, 'G' denotes the 'generator,' D' denotes the 'discriminator,' Z' denotes the 'random noise,' X' denotes the 'real data,' 'G(z)' denotes fake data generated from the random noise, 'D(x)' denotes the probability that the 'discriminator' determines to be true, and 'V(D,G)' denotes the loss function of the GAN.

In Equation 1 above, $\mathbb{E}_{x \sim P_{data}(x)}[\log D(X)]$ may be the operation part related to learning of the discriminator model, and $$\mathbb{E}_{z \sim P_x(z)}[\log(1-D(G(z)))]$$

may be the operation part related to learning of the generator model. Thus, the first processor 421 may train the generator model so that D(G(z)) becomes 1. Hence, if z may be known as shown in Equation 1, it may be possible to obtain the output value by the generator model. In other words, the generator model using z as its input may be a function corresponding to Equation 1.

For example, the input to the first processor 421 may be a noise signal and latent representation z 510 which may be called random noise. According to an embodiment, the random noise may be called random number or a random value or variable. If z indicating random noise is input, data may be generated from z by the function corresponding to Equation 1, and the generated data may be data created via learning to be similar to the original data. Thus, if z is determined based on Equation 1, pseudo data similar to the original data may be created in large quantities. Thus, once there is the generator model and random noise, a large amount of pseudo data may be provided.

For example, the similarity between the original data and pseudo data created by applying the random value (or random noise) to z is measured and, if the similarity between the original data and the generated pseudo data fails to reach a predetermined threshold, the step of measuring the similarity between the original data and original data newly created by applying the same random value to z may be repeated. As such, similarity measurement may be performed on each piece of pseudo data which is generated repeatedly until the similarity with the original data reaches the threshold whenever pseudo data is generated based on Equation 1. Thereafter, if the measured similarity reaches the predetermined threshold, and the pseudo data generated upon reaching the threshold is assumed to be first pseudo data, the first processor 421 may be aware of z which has been applied to generate the first pseudo data.

In other words, if learning is repeated until the accuracy of the generator model reaches the threshold with the same random value, and the trained generator model and one random value applied to the generator model are used, a large quantity of pseudo data may be created. Thus, it is possible to provide a large quantity of first pseudo data, which corresponds to the threshold, i.e., has the designated similarity, based on the applied z value.

According to an embodiment, the data server 250 may obtain not only pseudo data with a desired similarity (e.g., above a similarity threshold or within a similarity threshold range, such as, a range of 70% to 80%) but also a program (or generator model) for generating the pseudo data with the similarity and random number applied to the program upon obtaining the pseudo data with the similarity based on the result of comparison in similarity as set forth above and may store and manage the obtained pseudo data, random number, or program.

Here, the designated threshold may be preset and be varied by the settings of the manufacturer or user data managing entity, and two or more thresholds may be set.

As described above, the first processor 421 may have the parameters updated to gradually remove noise while learning is in progress and may generate pieces of pseudo data 530 which may have similar features to the original data. For example, 'original data and pseudo data are similar to each other in some features' may mean that the distribution of the original data may be partially identical or very close to the distribution of data generated by the first processor 421.

The first processor 421 may merely generate pieces of pseudo data 530 with different versions depending on the similarity, and determination of similarity may be performed by the processor 420 or the second processor 422. Thus, a different authority level may be designated for each piece of pseudo data which has reached its threshold, and the pseudo data 530 may be stored per version depending on the similarity.

Figure 6:
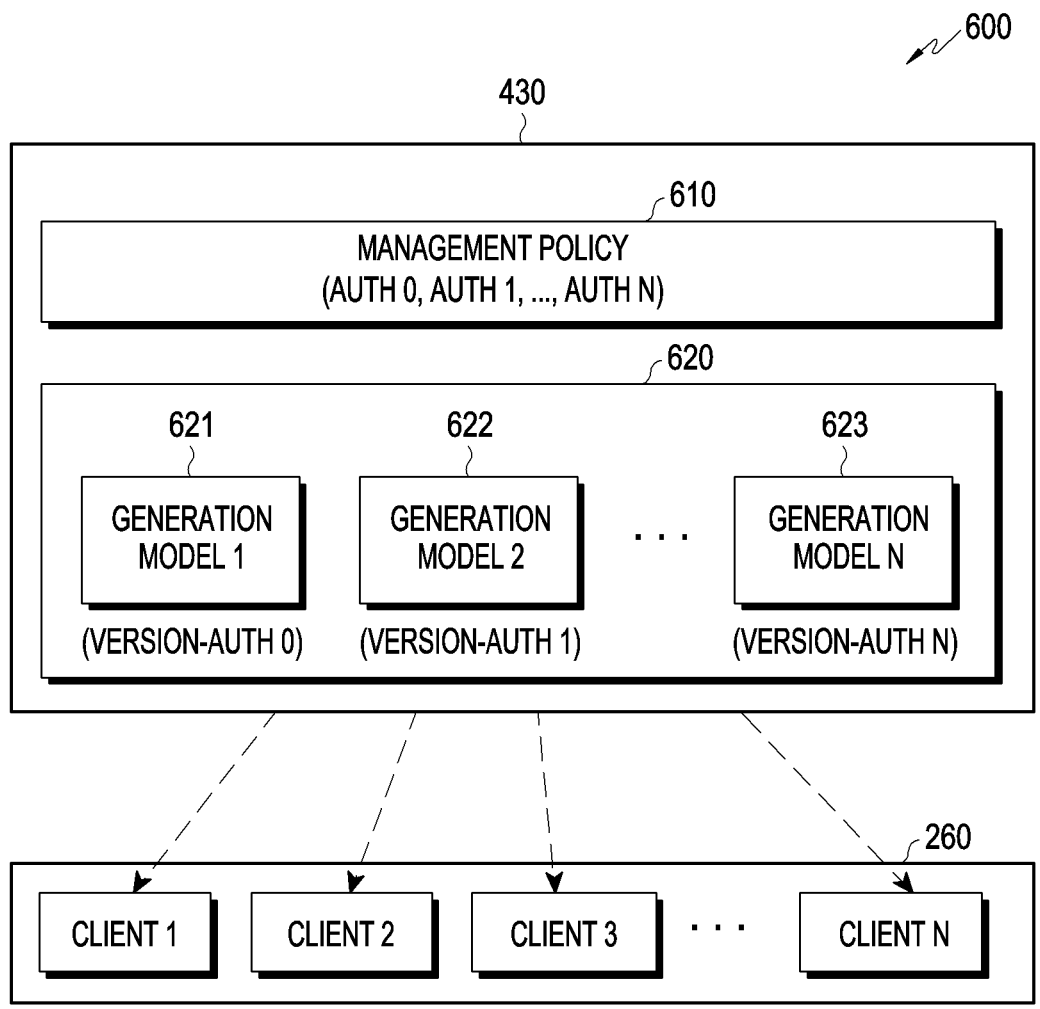
FIG. 6 is a view illustrating an example storage area of a memory according to an embodiment.

FIG. 6 is a view 600 illustrating an example storage area of a memory according to an embodiment.

Referring to FIG. 6, although the memory 430 is the same as the memory 430 of FIG. 4, the memory 430 may further include a management policy 610 for managing pseudo data and a generator model (or program) corresponding to the authority level, as an example.

The management policy 610 may contain information for which an authority level has been set per service operator or per external device. The authority level may be divided into a predetermined number of levels, e.g., auth 0, auth 1, . . . , auth N, but not limited thereto. For example, generator models (or programs) 621, 622, and 623 for generating pseudo data corresponding to the similarity may be divided per version depending on the similarity (or depending on the similarity thresholds or the similarity threshold ranges) and be stored in the generator model repository 620. Each generator model (or program) may be stored, with a corresponding authority designated therefor. The generator models (or programs) 621, 622, and 623 may be distributed to the service operator 260 which includes a plurality of clients with their respective corresponding authorities.

As set forth above, the processor 420 may store and manage the above-described per-service operator management policy 610 and the generator models (or programs) 621, 622, and 623 for providing pseudo data corresponding to the management policy in the memory 430.

Figure 7:
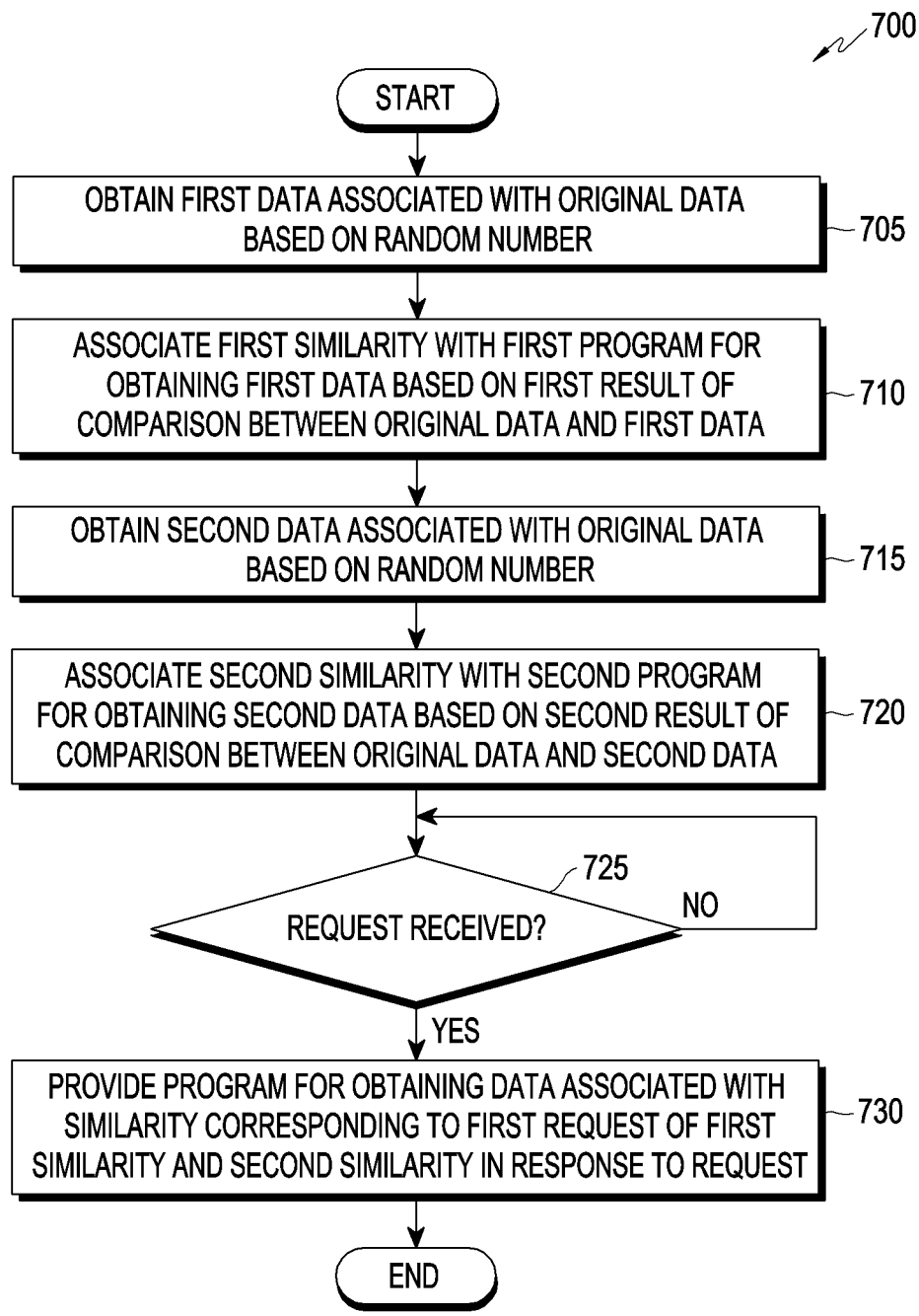
FIG. 7 is a flowchart illustrating operations of an electronic device for providing data associated with original data according to an embodiment.

FIG. 7 is a flowchart 700 illustrating operations of an electronic device for providing data associated with original data according to an embodiment.

FIG. 7 illustrates preparatory operations before providing data associated with original data, and the operation method may include operations 705 to 730. Each step/operation of the operation method may be performed by a server (e.g., the server 108 of FIG. 1 or the data server 250 or 251 of FIG. 2) and, if the data server is implemented in the form of an electronic device, each step/operation may be performed by at least one electronic device (e.g., the electronic device 101 of FIG. 1, the electronic device 401 of FIG. 4, or at least one processor (e.g., the processor 120 of FIG. 1 or the processor 420 of FIG. 4) of the electronic device). According to an embodiment, at least one of operations 705 to 730 may be omitted or changed in order or other operations may be added.

As an example, the operation of the electronic device 401 is described below.

In operation 705, the electronic device 401 may obtain first data associated with original data based on first random number. According to an embodiment, random number may be input to a preset program, thereby obtaining the first data. For example, the preset program may be a generator model as shown in Equation 1, and the random number may be random noise. Thus, if the random number is applied to the generator model, the first data may be output. The output first data may be termed pseudo data and, since it is not the same but has similar features to the original data on the service operator's position, it may be used for data analysis on behalf of the original data. According to an embodiment, the electronic device 401 may obtain the first data associated with original data based on random number using a first program.

In operation 710, the electronic device 401 may associate the first similarity with the first program for obtaining the first data based on the first comparison result between the original data and the first data. According to an embodiment, the electronic device 401 may obtain first similarity information between the original data and the first data. According to an embodiment, if the similarity between the original data and the first data corresponds to the first threshold as the first comparison result, a program for obtaining the first data may be stored along with the first data associated with the first similarity or the random number. Or, the first data associated with the first similarity may be stored as well. Upon storing the program for obtaining the first data, the random number used as the input value for training the program may also be stored. Further, upon storing the generator model such as the first program, the weight or parameter applied to the generator model upon training to reach the first threshold may also be stored.

For example, the electronic device 401 may identify whether the similarity between the original data and the first data matches the first threshold. If the similarity between the original data and the first data matches the first threshold, the electronic device 401 may store the first program, with the first program associated with the first similarity. Or, the first data associated with the first similarity may be stored as well. In this case, upon storing the first data associated with the first similarity or the first program, an authority for the similarity may be designated and stored. For example, a first authority level may be designated for the first similarity.

In operation 715, the electronic device 401 may obtain second data associated with original data based on random number. According to an embodiment, the same random number may be input to the program, thereby obtaining the second data. In other words, the second data may be obtained using the same random number as the random number which has been input upon obtaining the first data. According to an embodiment, the electronic device 401 may obtain second data associated with the original data based on the random number using a second program.

For example, after obtaining the first program for obtaining the first data corresponding to the first similarity, the electronic device 401 may change the first threshold to the second threshold. Here, changing the threshold may be adjusted stepwise, and the second threshold may be higher than the first threshold. By such learning, the weights for the generator and discriminator may be updated, and the weight of the program (or generator model) corresponding to each threshold may be obtained. Thus, after obtaining the first data corresponding to the first similarity, such information as weight or parameter may be adjusted via learning for obtaining the second data matching the second threshold.

In operation 720, the electronic device 401 may associate the second similarity with the second program for obtaining the second data based on the second comparison result between the original data and the second data. According to an embodiment, the electronic device 401 may obtain second similarity information between the original data and the second data. According to an embodiment, if the similarity between the original data and the second data corresponds to the second threshold as the second comparison result, the second program may be stored along with the second data associated with the second similarity or the random number.

For example, the electronic device 401 may identify whether the similarity between the original data and the second data matches (or exceeds) the second threshold. If the similarity between the original data and the second data matches (or exceeds) the second threshold, the electronic device 401 may store the second program, with the second program associated with the second similarity, along with the second data or the random number.

According to an embodiment, the first data and the second data may be obtained by repeated learning based on a generative adversarial network (GAN). In this case, since the data obtained via learning has a higher similarity to the original data as learning repeats, the second similarity may be higher than the first similarity and, thus, the second threshold may be higher than the first threshold. Corresponding to the similarity, the authority by which the service operator may access the stored data may be designated. According to an embodiment, the authority designated for the first similarity may be lower than the authority designated for the second similarity.

In operation 725, the electronic device 401 may identify whether a request for data is obtained from the external device. Here, the external device may be a data analyzer device to be used for actual data analysis or a data server located in a different region.

In operation 730, based on the request being obtained, the electronic device 401 may provide a program for obtaining data associated with the similarity corresponding to the request of the first similarity and the second similarity. According to an embodiment, in response to receiving a request, the electronic device 401 may provide the first program or the second program based on information included in the request that corresponds to a range that includes at least one of the first similarity information or the second similarity information. According to an embodiment, based on the request being obtained, the random number may be provided along with the program associated with the similarity corresponding to the request. According to an embodiment, based on the request being obtained, it is possible to, based on the request being obtained, identify an authority corresponding to the request and, corresponding to the identified authority, provide data associated with a similarity corresponding to the request of the first similarity and the second similarity. According to an embodiment, the electronic device 401 may store the first program associated with the first similarity information based on the first comparison result, which is between the original data and the first data and store the second program associated with the second similarity information based on the second comparison result, which is between the original data and the second data.

For example, the request may be obtained or received from the other party who has requested the data for analysis. In this case, the request may correspond to a request for data for analysis from the service operator but may be a request from the data server located in a different region. Thus, although data associated with the similarity for analysis is provided corresponding to the request from the service operator which is to actually analyze data, random number may be provided along with the generator model so that as much pseudo data as required may be generated corresponding to the request from the data server located in the different region.

According to an embodiment, the method may further comprise, corresponding to the request, identifying whether the request is for data corresponding to a first region identical to a region where the electronic device is located, and, based on identifying that the request is for the data corresponding to the first region, identifying an authority corresponding to the request; and providing data associated with a similarity corresponding to the identified authority of the first similarity and the second similarity.

According to an embodiment, the method may further comprise, corresponding to the request, identifying whether the request is for data corresponding to a second region different from a region where the electronic device is located, if the request is for the data corresponding to the second region, identifying an authority corresponding to the request, and providing a program for obtaining data associated with a similarity corresponding to the request of the first similarity and the second similarity.

Figure 8:
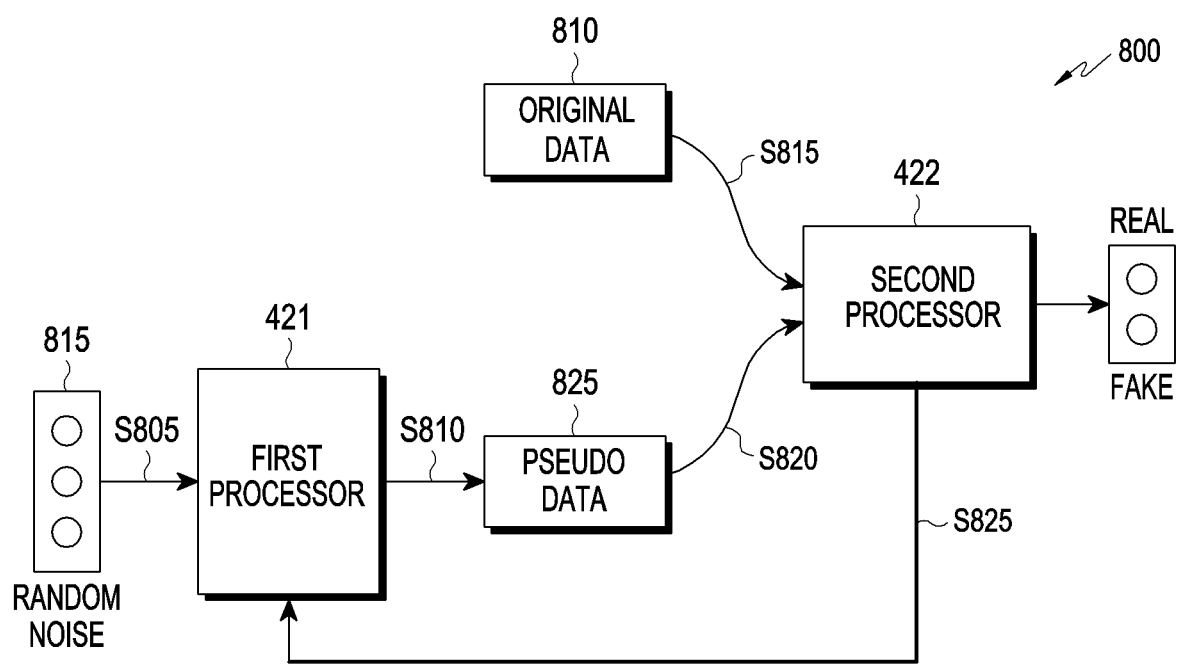
FIG. 8 is a view illustrating a process for obtaining data associated with original data by a GAN according to an embodiment.

FIG. 8 is a view 800 illustrating a process for obtaining data associated with original data by a GAN according to an embodiment.

Referring to FIG. 8, a random noise 815 may be input to a first processor 421 operated based on a generator model (S805), and pseudo data output (S810) from the first processor 421 may be transferred to the input (S820) of a second processor 422. In this case, the second processor 422 may be operated based on a discriminator model, obtain (e.g., simultaneously receive (S815 and S820)) the pseudo data 825 and original data 810, and return the result of comparison to the first processor 421 (S825).

As set forth above, the authenticity of the pseudo data 825 may be identified based on the original data 810 and pseudo data 825 obtained from the second processor 422, and the first processor 421 may be operated to adjust the parameter (or weight) to lower the success rate of determination of the authenticity by the second processor 422. As such, one cycle of S805 to S825 is referred to as a step. If more steps are present, the learning count of the first processor 421 increases and, as the learning count increases, it may be rendered more difficult for the second processor 422 to distinguish from the original data, and the pseudo data 825 provided from the first processor 421 may have more similarity with respect to the original data 810.

Figure 9:
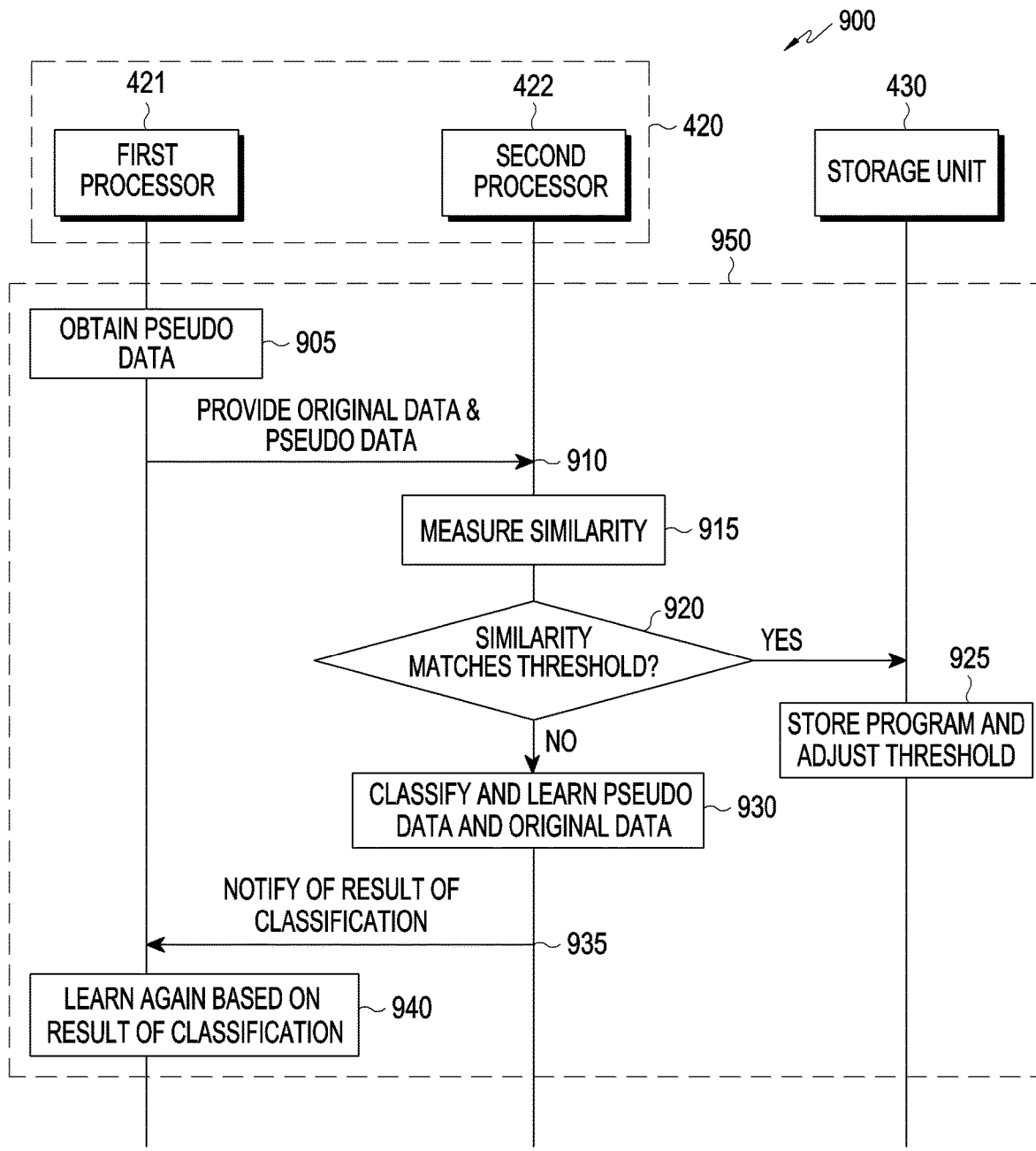
FIG. 9 is a flowchart illustrating the flow of signals between components of an electronic device according to an embodiment.

FIG. 9 is a flowchart 900 illustrating the flow of signals between components of an electronic device according to an embodiment. The operation method may include operations 905 to 940. Each step/operation of the operation method may be performed by a server (e.g., the server 108 of FIG. 1 or the data server 250 or 251 of FIG. 2) and, if the data server is implemented in the form of an electronic device, each step/operation may be performed by at least one electronic device (e.g., the electronic device 101 of FIG. 1, the electronic device 401 of FIG. 4, or at least one processor (e.g., the processor 120 of FIG. 1 or the processor 420 of FIG. 4) of the electronic device). According to an embodiment, at least one of operations 905 to 940 may be omitted or changed in order or other operations may be added.

Referring to FIG. 9, the first processor 421 included in the processor 420 of the electronic device (e.g., the electronic device 401 of FIG. 4) may obtain pseudo data in operation 905.

In operation 910, the first processor 421 may transfer the original data along with the pseudo data to the second processor 422.

In operation 915, the second processor 422 may measure the similarity between the pseudo data and the original data. Example similarity measuring schemes between pieces of data may include, but are not limited to, Euclidean distance, Mahalanobis distance, Minkowski distance, cosine similarity, or such schemes, or other various schemes may also be applied without limitations.

In operation 920, as a result of measuring similarity, the second processor 422 may identify whether the similarity between the pseudo data and the original data matches/corresponds to a designated threshold. If the similarity matches/corresponds to the designated threshold, the second processor 422 may store, in the memory 430, a program (or generator model) corresponding to the similarity matching the threshold and then adjust the threshold in operation 925. For example, the second processor 422 may adjust the first threshold into the second threshold. The second threshold may be higher than the first threshold. As learning makes progress, pseudo data generated has a data distribution of getting close to the original data and, thus, the similarity rises also. Thus, pseudo data which is closer to the original data may be obtained by increasing the threshold.

In contrast, if the similarity between the pseudo data and the original data does not match the threshold in operation 920, the second processor 422 may perform classification and learning on the original data and the pseudo data in operation 930. For example, the second processor 422 may identify whether the pseudo data coming to the second processor 422 is authentic as compared with the original data. Subsequently, the second processor 422 may notify the first processor 421 of the result of classification in operation 935.

Thus, the first processor 421 may perform learning again based on the result of classification in operation 940. For example, the first processor 421 may repeat the operation of adjusting the parameter (or weight) of the generator model to generate pseudo data corresponding to the random noise input. As set forth above, the operation 950 including operations 905 to 940 may be repeated until the similarity between the two pieces of data matches the maximum threshold among a plurality of thresholds. The plurality of thresholds may be preset to rise stepwise.

FIG. 10A is a view 1000*a* illustrating example data corresponding to original data in a first similarity according to an embodiment.

FIG. 10A illustrates original data 1005 and data 1010 corresponding to a first similarity in relation to the original data. Referring to FIG. 10A, the original data, i.e., gathered user data, may be stored in various saving formats, such as a database table, spreadsheet file, text file, or image file. FIG. 10A illustrates a spreadsheet file as an example. For example, the first similarity, which indicates the similarity between the original data and the obtained data 1010 as compared with the original data 1005 in FIG. 10A, is, e.g., 50%, and first pseudo data 1010 obtained by a first generator model of a first version is shown as an example.

FIG. 10B is a view 1000b illustrating example data corresponding to original data in a second similarity according to an embodiment.

FIG. 10B illustrates original data 1005 and data 1015 corresponding to a second similarity in relation to the original data. For example, the second similarity, which indicates the similarity between the original data and the obtained data 1015 as compared with the original data 1005 in FIG. 10B, is, e.g., 70%, and second pseudo data 1015 obtained by a second generator model of a second version is shown as an example.

FIG. 10C is a view 1000c illustrating example data corresponding to original data in a third similarity according to an embodiment.

FIG. 10C illustrates original data 1005 and data 1020 corresponding to a third similarity in relation to the original data. FIG. 10C illustrates original data 1005 and data 1020 corresponding to a third similarity in relation to the original data. For example, the third similarity, which indicates the similarity between the original data and the obtained data 1020 as compared with the original data 1005 in FIG. 10C, is, e.g., 90%, and third pseudo data 1020 obtained by a third generator model of a third version is shown as an example.

As set forth above, the electronic device (e.g., the electronic device 401 of FIG. 4) may measure the similarity between the actual data and pseudo data whenever the pseudo data is generated via the GAN model. The electronic device (e.g., the electronic device 401 of FIG. 4) may store the generator model, which has generated pseudo data matching a predetermined threshold, using a snapshot whenever the result of measurement of similarity via similarity measurement matches the threshold.

Thus, as shown in FIGS. 10A to 10C, the generator models used to obtain the first pseudo data to third pseudo data 1010, 1015, and 1020 depending on the data similarity as shown in FIGS. 10A to 10C may be associated with their respective similarities and be then stored per authority or per version. Thus, if an external request for data is obtained, the generator model that fits the authority level of the client corresponding to the external request or pseudo data using the generator model may be distributed.

Figure 11:
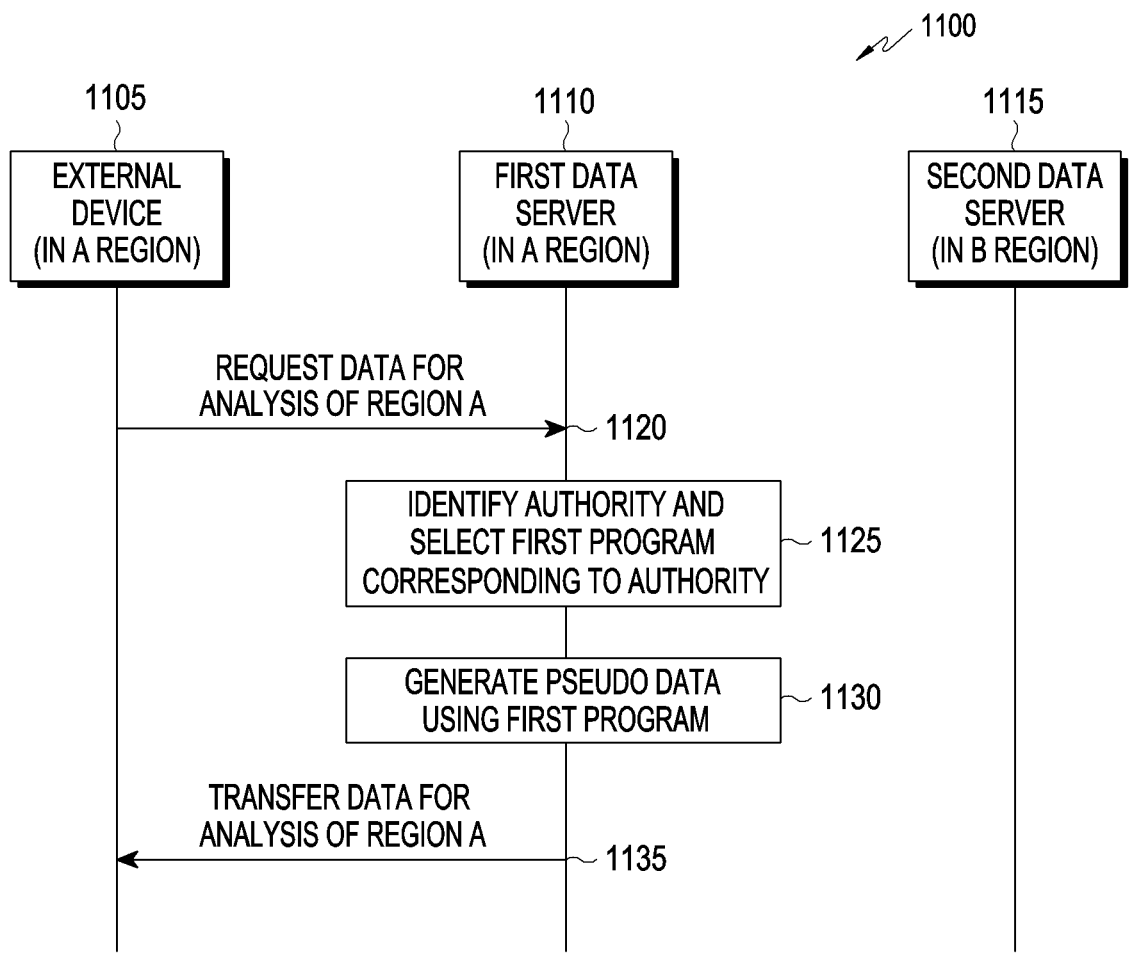
FIG. 11 is a view illustrating a process for requesting data for analysis in the same region according to an embodiment.

FIG. 11 is a view 1100 illustrating a process for requesting data for analysis in the same region according to an embodiment.

FIG. 11 illustrates an example in which an external device 1105 is located in the same region as a first data server 1110, and a second data server 1115 is located in a different region.

Referring to FIG. 11, the external device 1105 may request data for analysis for region A in operation 1120. Here, the external device 1105 may correspond to a service operator (e.g., the service operator 260 of FIG. 2) and, because of playing a role to analyze data, it may also be referred to as a data analyzer device.

Corresponding to the request, the first data server 1110 may identify the authority for the external device 1105 and select a first program (or generator model) corresponding to the authority. In this case, since the first program also stores relevant information, such as random number or parameter (or weight) used as the input to reach a designated threshold, the relevant information may also be selected corresponding to selection of the first program. Here, the authority indicates an authority by which the external device 1105 may access data for analysis and may be determined depending on what purpose the external device 1105 is to use the data for analysis for and the kind of the external device 1105 but not limited thereto. For example, the request obtained from the external device 1105 may contain information used to identify the authority for the external device 1105, and the information may include at least one of the kind of the external device 1105 and the use of the data for analysis or may contain designated authority information.

Subsequently, in operation 1130, the first data server 1110 may generate pseudo data, i.e., data for analysis, using the first program and, in operation 1135, transfer the data for analysis of region A corresponding to the request to the external device 1105. Here, random number stored along with the first program for generating the pseudo data for analysis may be put to use.

As described above, if the requested data corresponds to data for the region managed by the first data server 1110, the first data server 1110 may identify the authority of the external device 1105. The first data server 1110 may select the program corresponding to the identified authority among a plurality of programs, generate data for analysis using the selected program, and provide the generated data for analysis. For example, a program may be previously stored per designated similarity, and the program with the similarity corresponding to the authority may be selected.

According to an embodiment, the first data server 1110 may select the program corresponding to the identified authority among the plurality of programs, input the programs-applied random number to the selected program to thereby generate data for analysis using the selected program, and provide the generated data for analysis.

According to an embodiment, since data for analysis may be created unlimitedly if the selected program is used, the first data server 1110 may generate and provide as much data for analysis as requested. To that end, the external device 1105 may designate the quantity of data for analysis as necessary when the data is requested.

Figure 12:
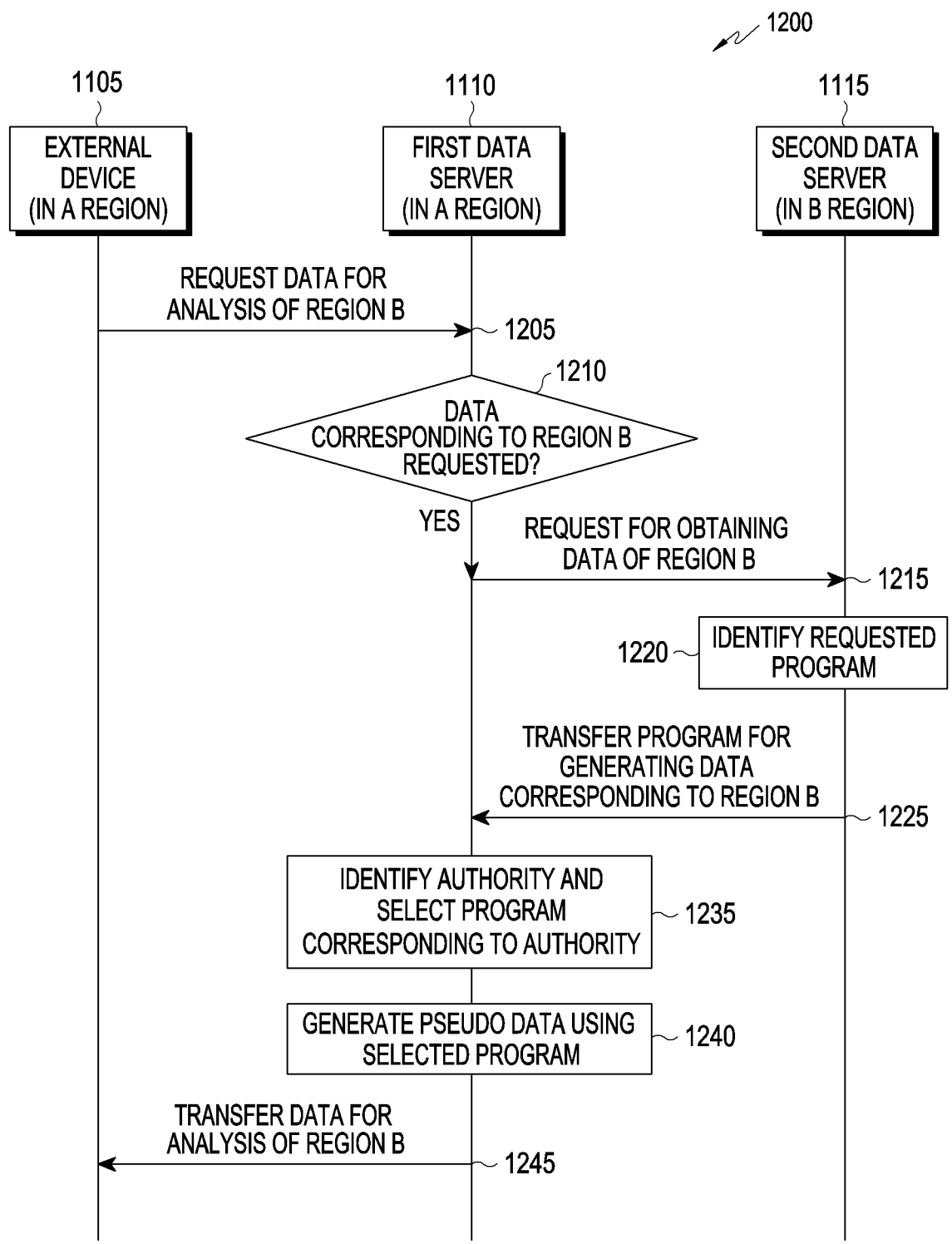
FIG. 12 is a view illustrating a process for requesting data for analysis in a different region according to an embodiment.

FIG. 12 is a view 1200 illustrating a process for requesting data for analysis in a different region according to an embodiment.

FIG. 12 illustrates an example in which an external device 1105 is located in the same region as a first data server 1110, and a second data server 1115 is located in a different region.

Referring to FIG. 12, the external device 1105 may request data for analysis for region B in operation 1205.

In operation 1210, corresponding to the request for data for analysis for region B, the first data server 1110 may identify whether the request is one for data for analysis for region B. If the request is one for data for analysis for a different region which is not the region managed by the first data server 1110, a request for obtaining the data for region B may be transmitted to the second data server 1115 managing region B in operation 1215.

In operation 1220, the second data server 1115 may identify the requested program (or generator model) corresponding to the request for obtaining the data for region B.

In operation 1225, the second data server 1115 may transfer the program for generating the data corresponding to region B to the first data server 1110. For example, the second data server 1115 may provide all of the plurality of programs which the second data server 1115 has or at least some programs corresponding to a request. In this case, providing the program for generating data corresponding to region B may mean providing a generator model trained via Equation 1 or providing the generator model alone or along with the random noise used as input to the generator model.

In operation 1235, the first data server 1110 may identify the authority for the external device 1105 and select the program corresponding to the authority. For example, the first data server 1110, upon obtaining two or more programs, may select the program corresponding to the authority.

In operation 1240, the first data server 1110 may generate pseudo data, i.e., data for analysis, using the selected program. For example, the first data server 1110 may identify how similar data for analysis should be provided based on the identified authority and may thus select the program corresponding to the authority. If such a program is selected, the first data server 1110 may also be aware of the random noise coming, as input, to the selected program and, by inputting the random noise to the selected program, may thus obtain a large quantity of data for analysis.

In operation 1245, the first data server 1110 may transfer the generated data for analysis for region B to the external device 1105. As such, a data analyst located in country A may obtain data with similar features to actual user data from a data server located in country B. Thus, it is possible to address legal issues and increase data utilization by exchanging not actual or sensitive data but data for analysis or programs (or generator models) for generating data for analysis between countries.

As set forth above, if the first data server 1110 located in the same region as the external device 1105 lacks data for another region requested by the external device 1105, the first data server 1110 may obtain a program (or generator model) for generating data for analysis from the second data server 1115 located in the other region. Subsequently, the first data server 1110 may generate data with the level corresponding to the authority of the external device 1105, e.g., the similarity corresponding to the authority, using the program (or generator model) for generating data for analysis and may provide the generated data, as data for analysis, to the external device 1105.

Figure 13:
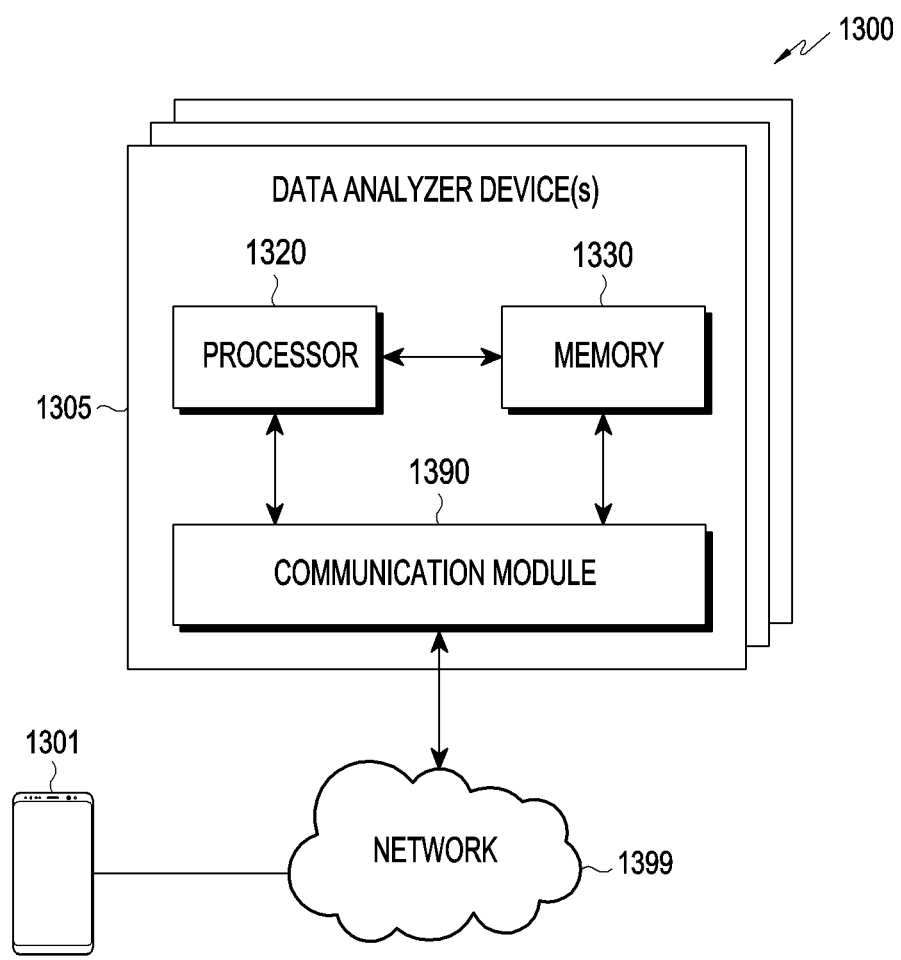
FIG. 13 is a block diagram illustrating a configuration of a data analyzer device according to an embodiment.

FIG. 13 is a block diagram 1300 illustrating a configuration of a data analyzer device according to an embodiment.

Referring to FIG. 13, a data analyzer device 1305 may be a device corresponding to the service operator and may also be referred to as an external device.

As shown in FIG. 13, the data analyzer device 1305 may include a processor 1320, a memory 1330, and a communication module 1390. According to an embodiment, since there is a plurality of service operators, there may also be a plurality of data analyzer devices 1305.

The operation of the data analyzer device 1305 may be the same or similar to the operation of the service operator 260 of FIG. 2. The data analyzer device 1305 may include a communication module 1390 for communicating with a data management server 250, a processor 1320 for analyzing pseudo data, and a memory 1330 for storing pseudo data.

The data analyzer device 1305 may analyze data necessary to provide service to the user. The service which is based on the result of analysis may be provided through the network 1399 to the user's electronic device 1301. For example, if an original photo captured via a refrigerator in a family hub is transmitted to the cloud, the cloud may train the GAN using the original photo. Thus, the cloud may manage and store the generator model matching per designated similarity according to the learning count and random noise which is the input value to the generator model. After identifying the authority corresponding to the request for data for analysis, the generator model corresponding to the authority or data for analysis obtained using the generator model may be provided.

According to an embodiment, the data analyzer device 1305 may provide user-customized services, such as home network services, health-care services, or education services. Other various services may also be provided, and what the service is to be provided to is not limited to the user's electronic device 1301.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C" and "at least one of A, B, or C" may include all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part" or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there is provided a non-transitory storage medium storing instructions, wherein the instructions are configured to, when executed by at least one processor, enable the at least one processor to perform at least one operation, the at least one operation comprising: obtaining first data associated with original data based on random number; associating a first similarity with a first program for obtaining the first data based on a first result of comparison between the original data and the first data; obtaining second data associated with the original data based on the random number; associating a second similarity with a second program for obtaining the second data based on a second result of comparison between the original data and the second data; and providing a program for obtaining data associated with a similarity corresponding to a request of the first similarity and the second similarity in response to the request.

As is apparent from the foregoing description, according to various embodiments, there may be provided a method for processing user data to differ depending on the management policy and providing the processed data.

According to various embodiments, non-real, processed data associated with original data may be provided, thereby raising security for sensitive data, e.g., user data, while allowing for use of data similar in feature to actual user data.

According to various embodiments data may be processed based on user data, ensuring that no sensitive information remains. The processed data may be provided to various developers or companies to be utilized as test data.

According to various embodiments, data processed differently depending on the entity demanding user data may be provided. Thus, it is possible to provide data that meets privacy policy and legal standards of the country where the data is to be used.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of the disclosure defined by the following claims.

What is claimed is:

1. An electronic device comprising:
communication circuitry;
at least one processor; and
a memory, wherein the memory stores instructions configured to, when executed, cause the at least one processor to:
obtain first pseudo data associated with original user data based on random number using a first program, wherein the first pseudo data is partially different from the original user data,
obtain a first similarity value indicating similarity between the original user data and the first pseudo data,
obtain second pseudo data associated with the original user data based on the random number using a second program, wherein the second pseudo data is partially different from the original user data,
obtain a second similarity value indicating similarity between the original user data and the second pseudo data, and
in response to receiving a request of an external device, provide, to the external device via the communication circuitry, the first program or the second program based on information included in the request that corresponds to at least one of the first similarity value or the second similarity value,
wherein the instructions are configured to cause the at least one processor to, in response to receiving the request, identify an authority corresponding to the request and provide pseudo data associated with a similarity value corresponding to the identified authority, and
wherein the first similarity value is lower than the second similarity value, and an authority designated for the first similarity value is lower than an authority designated for the second similarity value.

2. The electronic device of claim 1, wherein the instructions are configured to cause the at least one processor to store the first program associated with the first similarity value based on a first comparison result, which is between the original user data and the first pseudo data, and store the second program associated with the second similarity value based on a second comparison result, which is between the original user data and the second pseudo data.

3. The electronic device of claim 1, wherein the instructions are configured to cause the at least one processor to, in response to receiving the request, provide the random number along with a program, from among the first program and the second program, that has a similarity value, from among the respective first similarity value and the second similarity value.

4. The electronic device of claim 1, wherein the instructions are configured to cause the at least one processor to obtain the first pseudo data and the second pseudo data by performing repeated machine learning based on a generative adversarial network (GAN).

5. The electronic device of claim 1, wherein the instructions are configured to cause the at least one processor to:
based on the first similarity value corresponding to a first threshold or a first threshold range, store the first program along with the random number or the first pseudo data associated with the first similarity value, or
based on the second similarity value corresponding to a second threshold or a second threshold range, store the second program along with the random number or the second pseudo data associated with the second similarity value.

6. The electronic device of claim 5, wherein the instructions are configured to cause the at least one processor to identify the first similarity value and the second similarity value using a designated similarity scheme.

7. The electronic device of claim 1, wherein the instructions are configured to cause the at least one processor to, in response to receiving the request, identify whether the request is for pseudo data corresponding to a first region identical to a region where the electronic device is located, and
wherein the instructions are configured to cause the at least one processor to identify the authority corresponding to the request and provide pseudo data associated with the similarity value corresponding to the identified authority based on the request being for the pseudo data corresponding to the first region.

8. The electronic device of claim 1, wherein instructions are configured to enable the at least one processor to, corresponding to the request, identify whether the request is for pseudo data corresponding to a second region different from a region where the electronic device is located, and
wherein the instructions are configured to cause the at least one processor to identify the authority corresponding to the request and provide pseudo data associated with the similarity value corresponding to the identified authority based on the request being for the pseudo data corresponding to the second region.

9. A method for providing data associated with original data by an electronic device, the method comprising:
obtaining first pseudo data associated with original user data based on random number using a first program, wherein the first pseudo data is partially different from the original user data;
obtaining a first similarity value indicating similarity between the original user data and the first pseudo data;
obtaining second pseudo data associated with the original user data based on the random number using a second program;
obtaining a second similarity value indicating similarity between the original user data and the second pseudo data, wherein the second pseudo data is partially different from the original user data;
in response to receiving a request of an external device, providing, to the external device, the first program or the second program based on information included in the request that corresponds to at least one of the first similarity value or the second similarity value;
in response to receiving the request, identifying an authority corresponding to the request; and
providing pseudo data associated with a similarity value corresponding to the identified authority,
wherein the first similarity value is lower than the second similarity value, and an authority designated for the first similarity value is lower than an authority designated for the second similarity value.

10. The method of claim 9, further comprising:
storing the first program associated with the first similarity value based on a first comparison result, which is between the original user data and the first pseudo data; and
storing the second program associated with the second similarity value based on a second comparison result, which is between the original user data and the second pseudo data.

11. The method of claim 9, further comprising, in response to receiving the request, providing the random number along with a program, from among the first program and the second program, that has a similarity value, from among the respective first similarity value and the second similarity value.

12. The method of claim 9, wherein the first pseudo data and the second pseudo data are obtained by performing repeated machine learning based on a generative adversarial network (GAN).

13. The method of claim 9, further comprising:
based on the first similarity value corresponding to a first threshold or a first threshold range, storing the first program along with the random number or the first pseudo data associated with the first similarity value; or
based on the second similarity value corresponding to a second threshold or a second threshold range, storing the second program along with the random number or the second pseudo data associated with the second similarity value.

14. The method of claim 9, further comprising:
in response to receiving the request, identifying whether the request is for pseudo data corresponding to a first region identical to a region where the electronic device is located; and
wherein the identifying an authority corresponding to the request and the providing pseudo data associated with a similarity value corresponding to the identified authority are performed based on the request being for the pseudo data corresponding to the first region.

15. The method of claim 9, further comprising:
identifying whether the request is for pseudo data corresponding to a second region different from a region where the electronic device is located,
based on the request being for the pseudo data corresponding to the second region, identifying the authority corresponding to the request, and
providing a program for obtaining pseudo data associated with similarity corresponding to the identified authority.

16. A non-transitory storage medium storing instructions, wherein the instructions are configured to, when executed by at least one processor, cause the at least one processor to perform at least one operation, the at least one operation comprising:
obtaining first pseudo data associated with original user data based on random number using a first program, wherein the first pseudo data is partially different from the original user data;
obtaining a first similarity value indicating similarity between the original user data and the first pseudo data;
obtaining second pseudo data associated with the original user data based on the random number using a second program, wherein the second pseudo data is partially different from the original user data;
obtaining a second similarity value indicating similarity between the original user data and the second pseudo data;

in response to receiving a request of an external device, providing, to the external device, the first program or the second program based on information included in the request that corresponds to at least one of the first similarity value or the second similarity value, in response to receiving the request, identifying an authority corresponding to the request; and providing pseudo data associated with a similarity value corresponding to the identified authority, wherein the first similarity value is lower than the second similarity value, and an authority designated for the first similarity value is lower than an authority designated for the second similarity value.

\* \* \* \* \*